Patented June 8, 1926.

1,587,649

UNITED STATES PATENT OFFICE.

ERNST M. JOHANSEN, OF FALL RIVER, MASSACHUSETTS, ASSIGNOR TO THE ATLANTIC REFINING COMPANY, OF PHILADELPHIA, PENNSYLVANIA, A CORPORATION OF PENNSYLVANIA.

DESULPHURIZING OILS.

No Drawing. Application filed May 1, 1923. Serial No. 635,967.

My invention relates to a method of treating oils, as petroleum, shale oil and other mineral oils, and more particularly their products, to remove or reduce their sulphur content.

My invention will be described more particularly with regard to the treatment of petroleum, and particularly its distillates or products, as gasoline, naphtha and kerosene or lamp oil, which, for brevity, will be termed "light distillates."

Light distillates of the character referred to often contain so-called "sour" sulphur, consisting of compounds of sulphur of uncertain or unknown composition, and "corrosive" or free or elementary sulphur in solution.

Mineral oils often contain sulphur, free or combined in a large number of compounds. These compounds and free sulphur have a corrosive effect on copper, determinable by the well known "copper dish test" (technical paper, Bureau of Mines, No. 323, page 83, "Specification for testing petroleum products and methods for testing"), in accordance with which the oil is evaporated to dryness in a copper dish and presence or absence of black corrosion observed. These free and combined sulphur bodies which so effect corrosion are for brevity herein and in the appended claims termed "corrosive sulphur."

Certain other compounds of sulphur react to the well known "doctor test" (aforesaid technical paper, page 83), which consists in shaking the oil with a water solution of sodium plumbite and powdered sulphur. These compounds give a discoloration of the solid sulphur and/or oil, and the oil containing them is known as "sour". These compounds are for brevity herein and in the appended claims termed "sour sulphur."

In accordance with my invention, with the oil to be treated and containing sour sulphur or corrosive sulphur, or both, is blended an oil, preferably of substantially the same character, containing corrosive sulphur or sour sulphur, or both, and to the mixture is applied an aqueous solution of sodium plumbite, or equivalent, which reacts with the sour sulphur compounds to effect products with which the corrosive sulphur reacts.

Further in accordance with my invention, when corrosive sulphur is added to the oil to be treated, the corrosive sulphur may be either naturally or artificially in solution in an oil.

My invention resides in the method of treating oils as hereinafter described and claimed.

An oil or distillate containing sour sulphur, such, for example, as crude naphtha, may be subjected to any usual and customary preliminary treatment, as by washing with water or dilute solution of sodium hydroxide, to remove hydrogen sulphide. With the oil or distillate is thereafter mixed or blended a natural or artificial solution of corrosive or free sulphur in an oil, preferably of the character of or similar to that to be treated. The mixture is thereafter agitated in the presence of a solution of sodium plumbite, or equivalent soluble alkali-metal plumbite, and allowed to settle. Upon removal of the resultant precipitate and the aqueous solution, there remains a treated oil, which is practically clear after the aforesaid treatment, which may then be washed, as with water, and thereafter subjected to steam distillation. When crude naphtha or gas naphtha has been treated as described, the steam distillation yields a "sweet" gasolene, one substantially free of sour sulphur, and there remain bottoms of blending naphtha, lamp oil, etc., which are also sweet or substantially free of sour sulphur.

The free or elementary sulphur used in the removal of sour sulphur may be used as such by dissolving the same in an oil, preferably an oil of the character under treatment. That is, in treating a gasolene, naphtha or lamp oil the free or elementary sulphur as such is preferably dissolved in gasolene, naphtha, or lamp oil, whereby the character of the oil treated will not be substantially modified. For example, in treating lamp oil for removing sour sulphur in accordance with this method, if there should be utilized a free or elementary sulphur in solution in gasolene, gasolene would be present in the treated lamp oil, undesirably lowering the flash point of the lamp oil.

The artificial solution of free or elementary sulphur in oil of the character referred to may readily be produced in any suitable way. For example, an excess of free or elementary sulphur may be added to the solvent oil and agitated therewith at ordinary temperature, as, for example, by recourse to a circulating pump. After agitation the excess sulphur readily settles from the clear oil solution, which will contain from approximately 0.4 to 0.8 per cent of dissolved free sulphur In lieu of utilizing an artificially prepared solution of free or elementary sulphur, there may be used an oil or distillate containing corrosive or free sulphur Such an oil or distillate serves as a solution of free sulphur, which may be added to the oil or distillate to be treated.

In both cases, whether an artificial or natural solution of free sulphur in oil is utilized, it is preferred that the operation or treatment be a continuous one, as distinguished from batch operation, in that to a continuously flowing stream of oil or distillate to be treated with plumbite solution there be continuously added, in proper proportion, a solution of free or elementary sulphur in oil.

By utilization of a solution of free or elementary sulphur in oil, as distinguished from the addition of free or elementary powdered sulphur as such, the reaction of the free sulphur solution with the compounds formed by plumbite is practically instantaneous, permitting either continuous or batch operation, though continuous operation is preferred, and preventing an excess of free or elementary sulphur in the treated oil. Accordingly, by the use of a solution of elementary sulphur in oil, in lieu of elementary sulphur as such, the oil which has been treated for removal of sour sulphur will not when finished contain substantial amounts of elementary sulphur, and will therefore not be an oil which contains corrosive sulphur.

The amount or rate of addition of oil containing elementary sulphur in solution may be determined by a preliminary test which may be as follows:—The oil containing sour sulphur may be, for example, gas naphtha from standard white distillate. 1100 cubic centimeters of the gas naphtha may be agitated for, say, three minutes with 55 cubic centimeters of sodium plumbite solution. The addition of the sodium plumbite causes the gas naphtha to partake of a dark orange color. After the plumbite treatment the mixture is allowed to settle, and of the gas naphtha 100 cubic centimeters are taken, and there is gradually added thereto from a burette a solution of elementary sulphur in gas naphtha. "Breaking" or completion of reaction to form precipitate may take place after adding 1.7 cubic centimeters of the elementary sulphur solution. It then becomes known that 17 cubic centimeters of the sulphur solution will be sufficient for admixture with 1000 cubic centimeters of the gas naphtha to be treated with plumbite solution.

While the quantities above referred to are relatively small, the same procedure may be followed in determining the amount of solution of elementary sulphur in oil to be utilized in a large way in plant practice.

My invention is applicable also to the treatment of an oil or distillate containing free or corrosive sulphur, by adding thereto in proper proportions, determinable as in the foregoing example, an oil or distillate, preferably of the same character as the oil to be treated, containing sour sulphur, to be agitated in the presence of sodium plumbite or equivalent solution. The compounds formed by the reaction of the plumbite with the sour sulphur compounds then react with the free or elementary sulphur in the oil or distillate to be treated, causing a precipitate which is settled out, leaving the oil substantially free of corrosive or elementary sulphur, and also sweet or substantially free of sour sulphur.

By the methods hereinbefore described, the oil containing the free or elementary sulphur may be either the reagent or the oil to be treated, and the oil containing sour sulphur, may be either the oil to be treated or the reagent.

In both characters of treatment above described, and particularly when there is treated or utilized as reagent an oil naturally containing free or corrosive sulphur, both oils are at least in part desulphurized, one yielding up free or elementary sulphur, and the other sour sulphur, the resultant mixture of oils being sweet or free from sour sulphur compounds and also non-corrosive in the sense that it is free of corrosive or free sulphur.

Accordingly, by my invention the different types of oil commonly occurring in refinery practice, one containing sour sulphur compounds and the other elementary sulphur, may be utilized to treat or modify each other to desulphurize both.

If the amount of free or corrosive sulphur present in the oil or distillate containing also the sour sulphur compounds is small or insufficient to break or react with all of the compounds to be formed by the plumbite solution, additional elementary sulphur is added in the form of a solution of elementary sulphur in oil, preferably an oil of the character under treatment. By the addition of the sulphur solution the dark colored compounds formed upon addition of the plumbite solution will be completely broken, that is, the reaction will be complete, producing a precipitate which settles out, yielding an oil or distillate which is sweet or free of sour oil compounds, and also free of corrosive or free sulphur.

If, however, the oil or distillate contains an excess of elementary or free sulphur, the breaking or reaction of or with the compounds produced by reaction of the plumbite solution with the sour sulphur compounds will be complete, and the resultant oil will be sweet or free of sour sulphur compounds, but will still contain corrosive or elementary sulphur. In this case the excess of corrosive or free sulphur may be removed by adding in proper quantity to the oil to be treated an oil containing sour sulphur compounds. Or they may be blended with the oil containing sour sulphur compounds and an excess of elementary sulphur, before treatement with the sodium plumbite solution, an oil of the character first above referred to, to wit, one containing insufficient elementary sulphur. The mixture of the oils of the two types will be made in such proportions that the amount of elementary sulphur is just sufficient completely to break or react with the compounds to be formed by reaction of the sodium plumbite solution with the sour compounds present.

In the case of gasolenes derived, as by compression methods, from still gases resulting from destructive distillation of petroleum there is available in the refinery a material containing considerable amounts of free or elementary sulphur, which may be utilized in the ways hereinbefore described for removing sour sulphur and at the same time eliminating the free sulphur of the reagent solution. So far as I am aware, it has heretofore been the practice in refineries to remove the free sulphur from the gasolenes from still gases by redistillation, a process entailing considerable losses. However, in accordance with my invention, by using such gasolenes from still gases as reagent solution, a gasolene containing sour sulphur may be mixed with gasolenes from still gases containing elementary sulphur, with the result that both gasolenes are desulphurized, upon addition of plumbite yielding a mixture of gasolenes free of both sour sulphur and corrosive sulphur.

It shall be understood that my invention is not limited in its application to any particular method of treating a crude naphtha, gas naphtha or other crude distillate. For example, while I have hereinbefore referred to the washing of the crude distillate with water or dilute solution of sodium hydroxide, to remove hydrogen sulphide, it will be understood that the crude distillate or gas naphtha may be treated with sulphuric acid, followed by washing with water and/or hydroxide solution, and then the agitation with sodium plumbite solution may be effected after addition of the reagent oil solution.

For brevity, the term "sodium plumbite" is used in the appended claims in a generic sense to include sodium plumbite and equivalent soluble alkali-metal plumbites.

What I claim is:

1. In the treatment of mineral oil, the method which comprises blending oils containing, respectively, sour and corrosive sulphur, and subjecting the mixture to the action of sodium plumbite.

2. The method of treating mineral oil containing sour sulphur, which comprises blending therewith a mineral oil containing corrosive sulphur, and subjecting the mixture to the action of sodium plumbite.

3. The method of treating mineral oil containing sour sulphur, which comprises blending therewith an artificial solution of corrosive sulphur in oil, and subjecting the mixture to the action of sodium plumbite.

4. The method of treating mineral oil to reduce the sour sulphur and excess corrosive sulphur contents, which comprises blending with the oil to be treated an oil containing sour sulphur, subjecting the mixture to the action of sodium plumbite to form with the sour sulphur of both oils reaction products in quantity sufficient to react with substantially all of the corrosive sulphur present.

5. The method of treating mineral oil to reduce the sour sulphur and excess corrosive sulphur contents, which comprises blending with the oil to be treated an oil containing corrosive sulphur and an excess of sour sulphur, subjecting the mixture to the action of sodium plumbite to form with the sour sulphur of both oils reaction products in quantity sufficient to react with substantially all of the corrosive sulphur present.

6. The method of treating mineral oil to reduce its corrosive sulphur and excess sour sulphur contents, which comprises blending with the oil to be treated an oil containing corrosive sulphur, subjecting the mixture to the action of sodium plumbite to form with the sour sulphur of both oils reaction products in quantity sufficient to react with substantially all of the corrosive sulphur present.

In testimony whereof I have hereunto affixed my signature this 28 day of April, 1923.

ERNST M. JOHANSEN.